3,165,484
CARBON PAPER INK CONTAINING A TRIMELLITIC ACID-ALKANOL-NEOPENTYL GLYCOL POLYESTER

Ronald L. Broadhead, Park Forest, Ill., assignor to Standard Oil Company, Chicago, Ill., a corporation of Indiana
No Drawing. Filed Mar. 31, 1960, Ser. No. 18,806
10 Claims. (Cl. 260—28)

This invention relates to carbon paper and ink suitable for the preparation of carbon paper.

At the present time, carbon papers are prepared with ink (also called dope) containing as the important ingredient carnauba wax. Carnauba wax is of such importance in carbonizing inks because it imparts exceptionally good flow qualities to the finished ink and also has exceptional oil retention at ordinary temperatures for the oil contained in the ink. Other vegetable waxes, particularly ouricury, are utilized in the carbon paper ink but almost always in conjunction with carnauba wax. Carnauba wax is an expensive material and being of natural origin frequently varies in quality, dependent upon nature's weather and the care taken by the suppliers in the selection and purification of the wax. Heretofore, no one has been able to develop a replacement for carnauba wax; at best, wax-like materials have been provided which are capable of extending the carnauba wax in the formulation.

It has been discovered that a hereinafter defined resin possesses waxy characteristics of a nature which permit the formulation of carbonizing inks without using in the formulation any carnauba wax or any other wax such as is normally used in carbon paper ink. The waxy resin is utilized along with mineral oils of the usual type used in carbonizing ink and a color-affording ingredient to obtain a coating composition suitable for the preparation of carbon paper. In addition to these three essenial ingredients, carbon paper ink can be prepared which includes hydrocarbon wax and/or vegetable waxes. (Carnauba wax may be included in the coating composition of the invention but without imparting any favorable qualities beyond those already present in a composition not containing carnauba wax.)

For convenience, the coating composition i.e., carbonizing ink; carbon paper ink) ingredients are described in detail in separate sections hereinafter.

WAXY RESIN

The waxy resin ingredient of the coating composition is the resin polyesterification-condensation reaction product of a monoester of a trimellitic acid or anhydride and a primary alkanol containing from at least 18 to about 36 carbon atoms with an alkanediol to obtain a resin having an Acid Number (mg. KOH per g. of resin) of not more than about 30.

Instead of using an already existing monoester, a monoester may be made as a first step in the preparation of the resin by the ester reaction of the acid or anhydride with an alkanol—or mixture thereof—containing from at least 18 to about 36 carbon atoms. Illustrative primary alkanols are stearyl, $C_{18}$; docosanol, $C_{22}$; ceryl, $C_{26}$, myricyl, $C_{30}$; and hexatriacontyl, $C_{36}$; and the mixture of $C_{18}$, $C_{20}$, and $C_{22}$ alkanols available commercially, where the $C_{22}$ alkanol is the predominant component; a particularly suitable mixture of these alkanols contains 90% or more of the $C_{22}$ alkanol.

The acidic reactant is a trimellitic acid or trimellitic anhydride.

When the monoester is formed from the acidic member and an alkanol, the acidic member:alkanol reaction charge is in a mole ratio of about 1:0.9–1.1 and preferably equimolar.

The acidic member and the alkanol are vigorously agitated and the reaction carried out at a temperature below about 120° C.—this is in order to avoid formation of diesters and triesters. Generally the monoester reaction is carried out at a temperature from about 80° C. to 120° C., and more usually from about 100° C.–115° C.

The waxy resin is obtained by condensing the "monoesters" and an alkanediol containing from 2 to 6 carbon atoms in a straight chain between hydroxyl groups and a total of not more than 12 carbon atoms, such as ethylene glycol, propylene glycol, and 1,6-hexandiol. Particularly suitable alkanediols are neopentyl glycol and 1,4-butanediol.

The condensation reaction is carried out under more or less conventional conditions for polyesterification-condensation reactions. The reaction zone is vigorously agitated to improve contacting while the temperature is maintained between about 125° C. and 225° C., commonly on the order of 170° C. Water produced in the reaction is continuously withdrawn. The time of reaction is determined by the type of reactants and the temperature of reaction; the waxy solid resin product has an Acid Number of not more than about 30.

When an essentially pure monester is used in the condensation reaction, the mole ratio of said alkanediol to said monoester in said reaction zone is about 0.9–1.2:1 and preferably 1.1–1.2:1.

In the more usual instances when the "monoester" is made by direct reaction of acidic member and alkanol before the condensation reaction, the ratio of reactants in the condensation zone is related to the acidic member charged to the "monoester" prepared for simplicity in directions. The mole ratio of acidic member in the charge to the "monoester" preparation to the alkanediol is about 1:0.9–1.1 and is preferably 1:1.

The resin obtained from the condensation reaction is a waxy solid with, usually, a glossy surface. These waxy resins are very soluble in hydrocarbons which are solvents for natural waxes and solid paraffins. Examples of these solvents are naphtha, benzene, mineral spirits, toluene and chlorobenzenes. These resins also have a large solubility in alcohols, such as isopropanol and butanol.

Resins suitable for use in the ink of the invention are illustrated below:

Waxy Resin No. 1

In an ordinary beaker provided with a propeller stirrer, equipmolar amounts of trimellitic anhydride and a commercial mixture (Aldol 60) of $C_{18}$, $C_{20}$ and $C_{22}$ alkanols— 90% of the $C_{22}$—were reacted at a temperature over the range of 100°–155° C. At the beginning the beaker contained a slurry of solid anhydride particles in the liquid alcohols; at the end, the beaker contained a pasty solid of monoester.

98 g. (0.2 mole) of this monoester and 26 g. (0.25 mole) of neopentyl glycol were reacted, with vigorous stirring, in a flask fitted with a reflux condenser and water-trap, at 175°–195° C. for 4 hours. The produce was a pale tan, waxy resin with an Acid Number of 30.

30 grams of the resin was dissolved in 90 grams of mineral spirits by warming. The mineral spirits was a petroleum hydrocarbon having an ASTM distillation range of 307° F.–397° F. (153° C.–230° C.), a flash point of 104° F. (40° C.) and a Kauri-Butanol No. of 36.5. A yellow solution resulted which remained completely clear at room temperature.

Waxy Resin No. 2

Another waxy resin was prepared by reacting equimolar amounts of trimellitic anhydride and of the commercial Aldol 60 alkanol mixture described in Waxy Resin No. 1; and 1.2 moles of 1,4-butanediol per mole of the monoester. The reaction procedure was substantially identical with that described for Waxy Resin No. 1. The solid product Waxy Resin No. 2 was a pale tan solid having an Acid Number of about 25.

Waxy Resin No. 3

A third resin was prepared by preparing a monoester from the reaction of 1 mole of trimellitic anhydride with a mixture of 0.5 mole of Aldol 60 and 0.5 mole of octadecanol. The monoester was then condensed with 1.2 moles of neopentyl glycol under the conditions described for Waxy Resin No. 1. The product resin had an Acid Number of 28.

OIL

The carbonizing ink composition of the invention includes an oil of the type commonly utilized in carbonizing inks known at this time. Broadly, the composition includes a mineral oil having an SSU viscosity at 100° F. of about 70–425—SSU means Seconds Saybolt Universal. These mineral oils may include the very highly refined products sold as technical white oils or medicinal white oils. Or they may include oils of the lubricating oil type which have been solvent extracted or acid treated to improve storage stability and color. These oils may be of a pour point suitable for the particular final use of the carbon paper. The particular mineral oil will be selected in terms of the ultimate use of the finished carbon paper.

COLOR

The color affording ingredient utilized in the coating composition of the invention may be any of those pigments or dye stuffs utilized in presently available carbon papers. The most important pigment is carbon black; normally utilized in combination with a dye toner when a particular black color is desired. Another important pigment is iron blue. The oil soluble dye stuffs are particularly suitable color affording ingredients because the waxy resin ingredient appears to have taken into solution so completely these dye stuffs that solubilizers such as oleic acid are not necessary.

OTHER WAXES

The coating composition of the invention may include other waxes of the types normally utilized in carbon paper preparation. These waxes may include the vegetable waxes such as carnauba, ouricury, and candelilla; insect waxes such as beeswax and shellac; animal wax such as spermaceti; petroleum waxes such as paraffin wax, petrolatum wax, and high melting microcrystalline waxes; mineral waxes such as montans and ozokerite. Hereinafter the petroleum waxes and the mineral waxes are considered as hydrocarbon waxes.

The amount of these other waxes present in the coating composition may vary from zero to whatever amount is suitable for the particular formulation required. The particular type of other wax used will be dependent upon the ultimate use of the carbon paper prepared from the formulation.

It has been discovered that a very good carbonizing ink includes the waxy resin, hydrocarbon wax, color affording ingredient, and mineral oil in a relationship hereinafter set out.

COATING COMPOSITION

The coating composition of the invention consists essentially of mineral oil having an SSU viscosity at 100° F. of about 70–425, the color affording ingredient, and the hereinabove defined waxy resin.

A broad particular formulation consists of about 25–50 weight percent of waxy resin; the color affording ingredient ranges from about 1 to about 25 weight percent; and the remainder is essentially only mineral oil. The color affording ingredient will be present in an amount which is determined by the particular ingredient and the particular use. For example, when carbon black is utilized it is present generally in an amount from about 4–18 weight percent. Organic dye stuffs generally are present in an amount from about 1–3 weight percent. In addition to the mineral oil, minor amounts of other oils such as red oil, castor oil, and peanut oil may be present.

A broad particular formulation including hydrocarbon waxes consists of about 1–25 weight percent of color affording ingredient, about zero–25 weight percent of hydrocarbon waxes, about 50–15 weight percent of waxy resin and the remainder essentially only the hereinbefore defined mineral oil. The hydrocarbon wax and the waxy resin are present in a relation such that the sum of the resin and the wax present is at least about 40 weight percent, but not more than about 50 weight percent. When the wax content is zero then the resin content is at least about 25 weight percent.

It is to be understood that considerable variation may exist in formulations dependent upon the end use of the particular carbonizing ink formulation. It is not intended that the broad particular formulations described above limit the scope of the coating composition of the invention because those of ordinary skill in this art may readily devise a large number—as illustrated by the multiplicity of carbon ink formulations available—of formulations suitable for a particular purpose in the preparation of carbon papers.

CARBON PAPER

The coating composition of the invention is applied to a suitable base paper (carbonizing tissue) to obtain the finished carbon paper. The carbonizing tissues may be any of those utilized in the preparation of presently available commercial carbon papers. Chapter XII of Specialty Papers, Their Properties and Applications, 1950, Remsen Press, sets forth the large number of different carbonizing tissues available to and utilized by carbon paper manufacturers. It is to be understood that the carbon paper of the invention may utilize any of these base papers (carbonizing tissues) for accepting a coating of the carbonizing ink of the invention.

The methods of preparation of carbon papers now utilized and described in chapter XII of the above cited reference may be utilized with the coating composition of the invention to prepare carbon papers of the invention.

EXAMPLES

A number of carbonizing ink formulations were made up and used in the preparation of carbon paper suitable for typewriter or pencil copying. In all of these formulations, commercially available carbon black, dye stuffs, paraffin wax, carnauba wax, and mineral oil were used. The mineral oil utilized was a solvent extracted lubricating oil base stock having an SSU viscosity at 100° F. of 89. The waxy resins utilized in the formulations were those described in the section on "Waxy Resins." The carbon papers were prepared by applying ink at a temperature of 180°–200° F.

Example I

A black ink—this product was particularly suitable for pencil copying:

|  | Grams |
|---|---|
| SX5 mineral oil | 20.0 |
| Waxy Resin No. 1 | 10.0 |
| 122–125° F. melting point paraffin | 10.0 |
| #46 Cabot carbon black | 7.0 |

The heated charge was ground together in a mortar and pestle and then hot coated on onion skin. Good pencil copying properties were obtained.

Example II

A black ink for typewriter copying:

| | Grams |
|---|---|
| SX5 mineral oil | 48.0 |
| Waxy Resin No. 1 | 25.0 |
| 122–125° F. melting point paraffin | 25.0 |
| Crystal Violet | 0.70 |
| Oleic acid | 2.10 |
| Carbon black | 18.0 |

The charge was ball milled together for 30 minutes at 90–110° C. The resulting cake was firm and coated readily on onion skin paper. The charge was very fluid at 80° C. The carbon paper prepared from this ink gave good typewriter copying properties. The copies were quite smudge resistant but could be erased in case of error in typing.

Example III 2.0 grams additional waxy resin were added to 18.50 grams of the ink of Example II and blended in at 80° C. to give a very fluid mix at this temperature. The product showed good typewriter copying properties, clearness, sharpness, and smear resistance.

Example IV

A violet pencil copying ink:

| | Grams |
|---|---|
| Waxy Resin No. 2 | 10.0 |
| 122–125° F. melting paraffin | 20.0 |
| SX5 mineral oil | 10.0 |
| Crystal Violet | 1.0 |

The charge was melted together and stirred for 2 minutes to give a firm cake at room temperature. The product hot coated on onion skin paper to give a paper with very sharp, clear pencil copying characteristics.

Example V

A violet pencil copying ink using higher melting paraffin:

| | Grams |
|---|---|
| Waxy Resin No. 2 | 10.0 |
| 150° F. melting paraffin | 20.0 |
| SX5 mineral oil | 10.0 |
| Crystal Violet | 1.0 |

Example VI

A typewriter copying ink:

| | Grams |
|---|---|
| Waxy Resin No. 2 | 25.0 |
| 122–125° F. melting paraffin | 25.0 |
| SX5 mineral oil | 50.0 |
| Crystal Violet | 1.0 |
| Carbon black | 9.0 |

(It will be observed that here no oleic acid was used to disperse the dye.) The charge was ball milled together at 80–86° C. for 30 minutes. The resulting ink was very fluid at this temperature, and the ball mill yield was 87.6%. This latter value is a measure of the fluidity of the product. This product showed no change in viscosity upon heating for 3 weeks at 190–200° F.

Example VII

A black typewriter and pencil copying ink:

| | Grams |
|---|---|
| Waxy Resin No. 3 | 84.0 |
| 122–125° F. melting paraffin | 24.0 |
| SX5 mineral oil | 97.0 |
| Crystal Violet | 4.0 |
| Carbon black | 26.0 |

Ball milled together for 35 minutes at 98–100° C. The resulting paper required somewhat more aging one week as opposed to 3 days for the other carbon containing formulations to attain maximum hardness. Copying properties were good. Ball mill yield 92%.

Example VIII

A violet ink containing some carnauba wax:

| | Grams |
|---|---|
| Waxy Resin No. 2 | 5.0 |
| Carnauba wax | 5.0 |
| 122–125° F. melting paraffin | 10.0 |
| SX5 mineral oil | 20.0 |
| Crystal Violet | 0.40 |

The ink gave sharp copying properties when converted to carbon paper but there was no evident improvement as a result of the inclusion of the vegetable wax.

Example IX

The inks of Examples I–VIII were stored in stoppered containers in a oven held at a temperature of 190–200 F. for 21 days. None of these inks showed any change in viscosity or the appearance of thixotropy after this storage test. (This test is of importance in that storage under these conditions of commercial formulations which do not contain significant amounts of carnauba wax or ouricury wax usually show a large viscosity increase or the development of a thixotropic body.)

Example X

A blend was prepared of 10 grams of Waxy Resin No. 1, 10 grams of microcrystalline wax (170–175° F. melting point), and 20 grams of medicinal white mineral oil having a viscosity of 300 seconds Saybolt Universal at 100° F. This blend was fluid and showed good flow quality at 160° F. The blend was cooled to room temperature of about 75° F. A solid cake was formed. This cake did not bleed oil or even show oil droplets on the surface. The cake could be snapped readily by finger pressure. The solid cake produced by this blend showed all of the desirable room temperature characteristics possessed by good quality carnauba wax-oil blends at these conditions.

Thus having described the invention, what is claimed is:

1. A coating composition suitable for preparation of carbon paper which composition consists essentially of (A) mineral oil having an SSU viscosity at 100° F. of about 70–425; (B) a color affording ingredient; and (C) waxy resin prepared by the polyesterification-condensation reaction of (I) a monoester of an acidic member selected from the class consisting of trimellitic acid and anhydride thereof and a primary alkanol containing from at least 18 to about 36 carbon atoms and (II) an alkanediol containing from 2 to 6 carbon atoms in a straight chain between hydroxyl groups and a total of not more than 12 carbon atoms in a mole ratio of said alkanediol to said monoester of from about 0.9:1 to about 1.2:1, said reaction being at a temperature between about 125° C. and 225° C., with continuous withdrawal of water of reaction to obtain a waxy solid resin product having an Acid Number of not more than about 30.

2. The composition of claim 1 wherein said resin is prepared by the polyesterification-condensation reaction of (A) the monoester made by reacting (i) an acidic member selected from the class consisting of trimellitic acid and anhydride thereof and (ii) a primary alkanol containing from at least 18 to about 36 carbon atoms, in a mole ratio of said acidic member to said alkanol of about 1:0.9–1.1 at a temperature below about 120° C., and (B) an alkanediol containing from 2 to 6 carbon atoms in a straight chain between hydroxyl groups and a total of not more than 12 carbon atoms, in a mole ratio of acidic member present in the charge to A to said alkanediol of from about 1:0.9–1.2.

3. The composition of claim 2 wherein said acidic member is trimellitic anhydride.

4. The composition of claim 2 wherein said alkanol is a mixture of primary alkanols having 18–22 carbon atoms, and the $C_{22}$ alkanol is the predominant alkanol.

5. The composition of claim 2 wherein said alkanediol is neopentyl glycol.

6. An ink adapted for the preparation of carbon paper which ink consists of (A) about 1–25 weight percent of color affording ingredient, (B) about 25–50 weight percent of waxy resin and (C) the remainder essentially only mineral oil having a viscosity of about 70–425 seconds Saybolt Universal at 100° F., and said resin is prepared by the polyesterification-condensation reaction of (I) a monoester of an acidic member selected from the class consisting of trimellitic acid and anhydride thereof and a primary alkanol containing from at least 18 to about 36 carbon atoms and (II) an alkanediol containing from 2 to 6 carbon atoms in a straight chain between hydroxyl groups and a total of not more than 12 carbon atoms, in a mole ratio of said alkanediol to said monoester of from about 0.9:1 to about 1.2:1, said reaction being at a temperature between about 125° C. and 225° C., with continuous withdrawal of water of reaction to obtain a waxy solid resin product having an Acid Number of not more than about 30.

7. Carbon paper consisting of carbonizing tissue coated with the ink of claim 6.

8. A carbonizing ink consisting of (A) about 1–25 weight percent of color affording ingredient, (B) about zero–25 weight percent of hydrocarbon wax, (C) about 50–15 weight percent of waxy resin, the sum of the wax and resin present being from at least about 40 to about 50 weight percent and the resin being at least about 25 when wax is zero, and (D) the remainder essentially only a mineral oil having a viscosity of about 70–425 seconds Saybolt Universal at 100° F., and said resin is prepared by the polyesterification-condensation reaction of (I) a monoester of an acidic member selected from the class consisting of trimellitic acid and anhydride thereof and a primary alkanol containing from at least 18 to about 36 carbon atoms and (II) an alkanediol containing from 2 to 6 carbon atoms in a straight chain between hydroxyl groups and a total of not more than 12 carbon atoms, in a mole ratio of said alkanediol to said monoester of from about 0.9:1 to about 1.2:1, said reaction being at a temperature between about 125° C. and 225° C., with continuous withdrawal of water of reaction, to obtain a waxy solid resin product having an Acid Number of not more than about 30.

9. Carbon paper consisting of carbonizing tissue coated with the ink of claim 8.

10. The composition of claim 2 wherein said acidic member is trimellitic anhydride, said alkanol is a mixture of primary alkanols having 18–22 carbon atoms, and the $C_{22}$ alkanol is the predominant alkanol, and said alkanediol is neopentyl glycol.

References Cited in the file of this patent

UNITED STATES PATENTS

| | | |
|---|---|---|
| 2,421,291 | Schmutzler | May 27, 1947 |
| 2,426,248 | Sugarman | Aug. 26, 1947 |
| 2,890,125 | Mange | June 9, 1959 |
| 2,939,857 | Bolton et al. | June 7, 1960 |